(12) United States Patent
Chauhan et al.

(10) Patent No.: US 11,265,396 B1
(45) Date of Patent: Mar. 1, 2022

(54) SYSTEM FOR CROSS CHANNEL DATA CACHING FOR PERFORMING ELECTRONIC ACTIVITIES

(71) Applicant: BANK OF AMERICA CORPORATION, Charlotte, NC (US)

(72) Inventors: Sandeep Kumar Chauhan, Telangana (IN); Udaya Kumar Raju Ratnakaram, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 8 days.

(21) Appl. No.: 17/060,243

(22) Filed: Oct. 1, 2020

(51) Int. Cl.
| | |
|---|---|
| H04L 12/24 | (2006.01) |
| H04L 12/851 | (2013.01) |
| H04L 12/927 | (2013.01) |
| H04L 12/911 | (2013.01) |
| G06F 15/16 | (2006.01) |
| H04W 40/24 | (2009.01) |
| H04W 16/22 | (2009.01) |
| G06F 16/23 | (2019.01) |
| G06F 12/0875 | (2016.01) |
| G06F 12/0862 | (2016.01) |
| H04L 67/568 | (2022.01) |
| H04L 43/0864 | (2022.01) |
| G06F 12/0802 | (2016.01) |

(52) U.S. Cl.
CPC ...... H04L 67/2842 (2013.01); G06F 12/0802 (2013.01); H04L 43/0864 (2013.01); G06F 2212/154 (2013.01)

(58) Field of Classification Search
CPC ............ H04L 67/2842; H04L 43/0864; G06F 12/0802; G06F 2212/154

USPC .......................................................... 709/217
See application file for complete search history.

(56) References Cited

U.S. PATENT DOCUMENTS

| | | | |
|---|---|---|---|
| 5,802,292 | A | 9/1998 | Mogul |
| 6,003,114 | A | 12/1999 | Bachmat |
| 6,085,193 | A | 7/2000 | Malkin et al. |
| 6,128,701 | A | 10/2000 | Malcolm et al. |

(Continued)

FOREIGN PATENT DOCUMENTS

CN        104838350 A  *  8/2015  ........... G06F 1/1637

*Primary Examiner* — David R Lazaro
*Assistant Examiner* — Berhanu Shitayewoldetadik
(74) *Attorney, Agent, or Firm* — Moore & Van Allen PLLC; Vaidehi Bachot

(57) ABSTRACT

Embodiments of the invention are directed to system structured for dynamically adapted, time latency-based, cross channel data caching for performing electronic activities. The invention is structured for selective proactive data caching based on interdependency of electronic activities and transformation of cached data for transmission through a plurality of communication channels, for reducing memory and processing burdens on data caching servers and reducing turnaround time for activity execution. Specifically, the invention is configured to detect initiation of a first technology activity event by a user at a first time, and in response, determine a second interdependent technology activity event. The invention is also structured for caching second event data for the second technology activity event prior to a second time associated with initiation of the second technology activity event at a second network device associated with a second communication channel.

20 Claims, 6 Drawing Sheets

(56) References Cited

U.S. PATENT DOCUMENTS

| | | | |
|---|---|---|---|
| 6,272,598 B1 | 8/2001 | Arlitt et al. | |
| 6,766,422 B2 | 7/2004 | Beyda | |
| 6,813,501 B2 | 11/2004 | Kinnunen et al. | |
| 7,054,917 B1 | 5/2006 | Kirsch et al. | |
| 7,454,393 B2 | 11/2008 | Horvitz et al. | |
| 8,112,409 B2 | 2/2012 | Shen et al. | |
| 8,364,611 B2 | 1/2013 | Tendjoukian et al. | |
| 8,688,453 B1 | 4/2014 | Joshi et al. | |
| 8,793,706 B2 | 7/2014 | Villadsen et al. | |
| 8,886,576 B1 | 11/2014 | Sanketi et al. | |
| 9,015,081 B2 | 4/2015 | Horvitz et al. | |
| 9,047,235 B1 | 6/2015 | Barraclough et al. | |
| 10,684,950 B2 * | 6/2020 | Chauhan | H04L 67/22 |
| 2003/0187960 A1 * | 10/2003 | Koba | H04L 69/04 |
| | | | 709/219 |
| 2005/0005007 A1 | 1/2005 | Keohane et al. | |
| 2005/0060498 A1 | 3/2005 | Curtis | |
| 2006/0106784 A1 | 5/2006 | Alpha | |
| 2007/0067293 A1 | 3/2007 | Yu | |
| 2009/0056525 A1 | 3/2009 | Oppenheimber | |
| 2009/0063646 A1 | 3/2009 | Mitnick | |
| 2009/0328087 A1 | 12/2009 | Higgins et al. | |
| 2010/0070554 A1 | 3/2010 | Richardson et al. | |
| 2012/0198020 A1 | 8/2012 | Parker et al. | |
| 2012/0259821 A1 | 10/2012 | Alam | |
| 2015/0095587 A1 | 4/2015 | Xu et al. | |
| 2015/0363105 A1 * | 12/2015 | Nakao | G06F 12/0246 |
| | | | 711/103 |
| 2016/0021164 A1 | 1/2016 | Chakarapani et al. | |
| 2016/0337792 A1 * | 11/2016 | Bhavsar | H04L 43/0864 |
| 2017/0041267 A1 | 2/2017 | Walkin et al. | |
| 2017/0242895 A1 * | 8/2017 | Kephart | G06F 16/24575 |
| 2020/0177469 A1 * | 6/2020 | Kercheville | H04L 41/147 |

* cited by examiner

SYSTEM FOR CROSS CHANNEL DATA CACHING FOR PERFORMING ELECTRONIC ACTIVITIES

FIELD OF THE INVENTION

The present invention generally relates to dynamically adapted, time latency-based, cross channel data caching for performing electronic activities. Embodiments of the invention are structured for selective proactive data caching based on interdependency of electronic activities and transformation of cached data for transmission through a plurality of communication channels, for reducing memory and processing burdens on data caching servers and reducing turnaround time for activity execution.

BACKGROUND

There has been a significant increase in the number of electronic activities, particularly online and mobile activities due to widespread use of smartphone, tablet computers, laptop computers, transaction terminals, and electronic computing devices in general. Performing electronic activities requires the devices to repeatedly fetch relevant data from backend servers, external databases/networks, and/or other backend systems/devices. However, fetching data from backend systems results in a time lag, causing delays in execution of the electronic activities. Some conventional systems employ data caching, in an attempt to reduce these delays. However, these conventional systems typically cache almost all provided data commencing since the time of the users' login, in its entirety. Conventional systems are neither able to determine the relevancy of the data for current activities, much less for future activities, nor envisage how long the data needs to be cached for, thereby resulting in large amounts of irrelevant cached data that is stored over extended time periods. However, caching such immense amounts of data causes severe burdens on data caching servers, such as heavy memory and processing loads. Moreover, the enormity of the amounts of the data being cached results in slow turnaround times for the searching and fetching relevant data, thereby impeding the very purpose of data caching. In addition, typically, the data cached by conventional systems is specific to a particular device, and conventional systems are not able to transform cached data across channels, causing further delays.

The present invention provides a novel dynamically adapted, time latency-based, cross channel data caching for performing electronic activities, that alleviates the above deficiencies and also provides other advantages. The previous discussion of the background to the invention is provided for illustrative purposes only and is not an acknowledgement or admission that any of the material referred to is or was part of the common general knowledge as at the priority date of the application.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing systems, computer program products and methods for dynamically adapted, time latency-based, cross channel data caching for performing electronic activities. Typically, the system is structured for selective proactive data caching based on interdependency of electronic activities and transformation of cached data for transmission through a plurality of communication channels, for reducing memory and processing burdens on data caching servers and reducing turnaround time for activity execution. In some instances, the system comprises: at least one memory device with computer-readable program code stored thereon, at least one communication device, at least one processing device operatively coupled to the at least one memory device and the at least one communication device, wherein executing the computer-readable program code is typically configured to cause the at least one processing device to perform, execute or implement one or more features or steps of the invention such as: detect, via a request processing module, initiation of a first technology activity event by a user at a first time via a first network device associated with a first communication channel; capture live event data associated with the first technology activity event via the first network device; extract, from a technology event database, prior technology event data associated with the first network device and/or the user based on analyzing the live event data; determine, via an event interdependency analyzer application, (i) one or more technology contexts associated with the first technology activity and (ii) one or more interdependent technology activity events associated with the first technology activity, based on analyzing the extracted prior technology event data; determine, via the event interdependency analyzer application, a time latency associated with each of the one or more determined interdependent technology activity events based on analyzing the extracted prior technology, wherein determining the time latency comprises determining a time to fetch parameter associated with the one or more determined interdependent technology activity events; extract, via a data caching application, second event data for execution of a second technology activity event of the one or more determined interdependent technology activity events from one or more event data hub devices at a predetermined first time interval preceding a second time associated with initiation of the second technology activity event, wherein the predetermined first time interval is associated with the determined time to fetch parameter associated with the time latency of the first technology activity event; cache the extracted second event data for the second technology activity event of the one or more determined interdependent technology activity events prior to the second time associated with initiation of the second technology activity at a second network device associated with a second communication channel, via a channel adapter associated with the second communication channel, such that the cached second event data is structured for execution of the second technology activity event at the second time in future; determine a time to live parameter associated with the second technology activity of the one or more determined interdependent technology activity events; and discard the cached second event data at the second network device upon determining elapse of a predetermined second time interval associated with the time to live parameter associated with the second technology activity.

In some embodiments, or in combination with any of the previous embodiments, determining the one or more interdependent technology activities associated with the first technology activity further comprises: parsing the prior technology event data to determine a prior first technology activity event that matches the first technology activity; and identifying one or more prior second technology activities from the prior technology event data; determining the one or more prior second technology activities as the one or more interdependent technology activities in response to identifying that (i) the one or more prior second technology activities succeeded the prior first technology activity event, and that (ii) the one or more prior second technology activities comprise an event nexus with the prior first technology activity event.

In some embodiments, or in combination with any of the previous embodiments, one or more interdependent technology activity events comprise a plurality of interdependent technology activity events associated with the first technology activity. Here, the invention is structured to: determine a context severity parameter associated with each of the plurality of interdependent technology activity events; and identify the second technology activity event of the plurality of interdependent technology activity events based on the determining that the context severity parameter of the second technology activity event is above a predetermined threshold.

In some embodiments, or in combination with any of the previous embodiments, the invention is structured to: determine second event data required for executing the second technology activity event of the one or more determined interdependent technology activity events; and determine the one or more event data hub devices of a plurality of event data hub devices comprising the second event data required for executing the second technology activity event of the one or more determined interdependent technology activity events.

In some embodiments, or in combination with any of the previous embodiments, caching the extracted second event data for the second technology activity event, further comprises: transmitting the extracted second event data to a cache server database associated with the channel adapter of the second communication channel of the second networked device, wherein the channel adapter configured to transform the extracted second event data into a format compatible with the second communication channel associated with the second network device; and storing the extracted second event data in the cache server database associated with the channel adapter of the second communication channel until elapse of the predetermined second time interval associated with the time to live parameter with the second technology activity; and wherein discarding the cached second event data at the second network device further comprises deleting the stored second event data in the cache server database upon elapse of the predetermined second time interval associated with the time to live parameter with the second technology activity.

In some embodiments, or in combination with any of the previous embodiments, the invention is structured to: detect, via the second network device associated with the second communication channel, initiation of the second technology activity event by the user at the second time; extract the cached second event data via the channel adapter associated with the second communication channel, wherein the channel adapter configured to transform the extracted second event data into a format compatible with the second communication channel associated with the second network device; transmit the cached second event data to the second networked device; and execute the second technology activity event at the second networked device using the cached second event data.

In some embodiments, or in combination with any of the previous embodiments, extracting the cached second event data further comprises: overriding an existing extraction protocol associated with a cache server database associated with the channel adapter of the second communication channel of the second networked device.

In some embodiments, or in combination with any of the previous embodiments, the invention is structured to: identify, for the second technology activity event of the one or more determined interdependent technology activity events, one or more network devices for executing the second technology event; determine the second network device of the one or more network devices for executing the second technology event based on (i) the one or more technology contexts associated with the first technology activity, and/or (ii) prior technology event data associated with the first network device and/or the user; identify the channel adapter configured to transform the extracted second event data into a format compatible with the second communication channel associated with the second network device; and transmit the extracted second event data to the channel adapter associated with the second communication channel.

In some embodiments, or in combination with any of the previous embodiments, wherein transmitting the extracted second event data to the channel adapter, further comprises transmitting the extracted second event data to a cache server database associated with the channel adapter of the second communication channel of the second networked device.

In some embodiments, or in combination with any of the previous embodiments, the second communication channel is different from the first communication channel.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
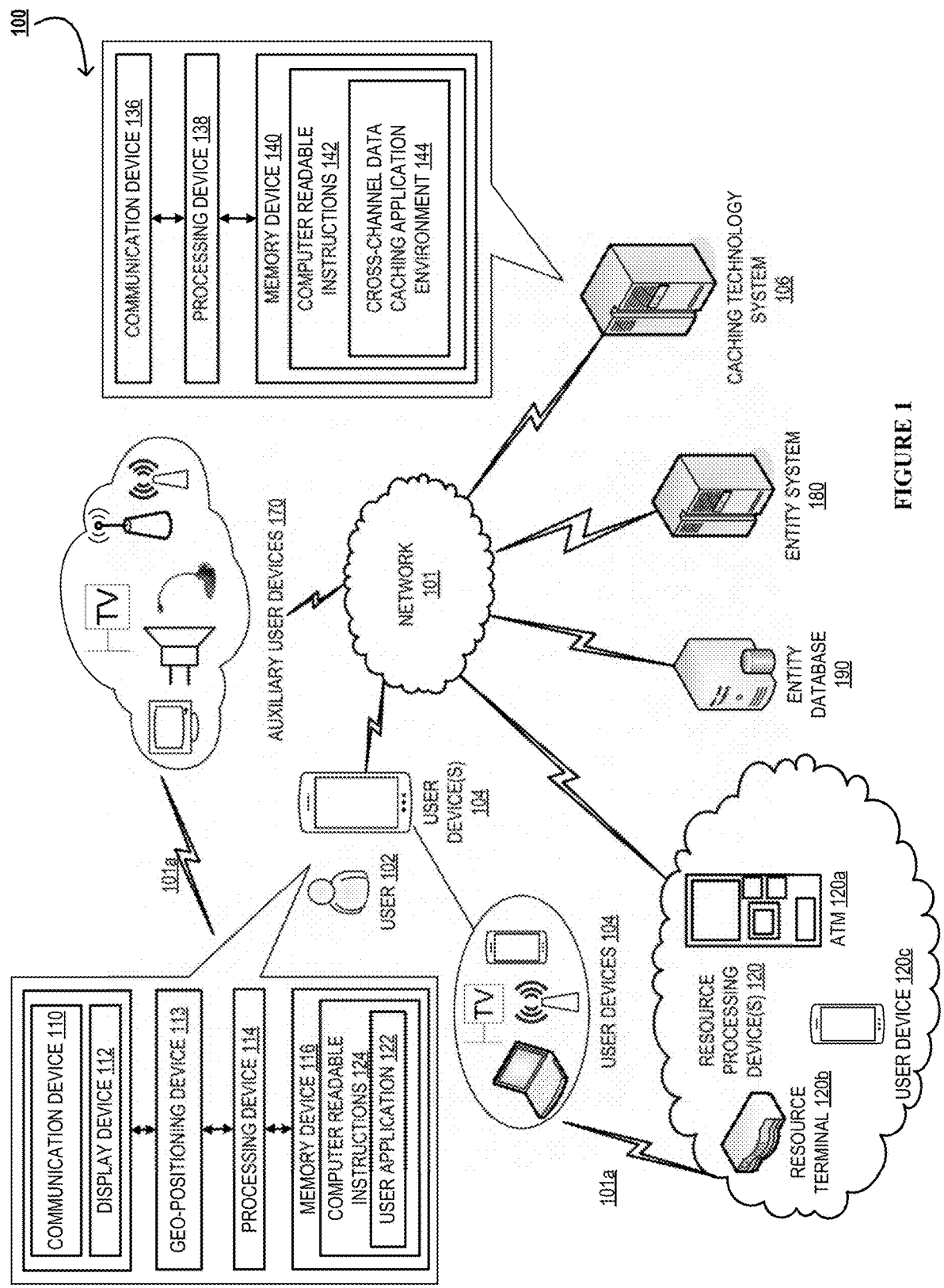
Figure 2A:
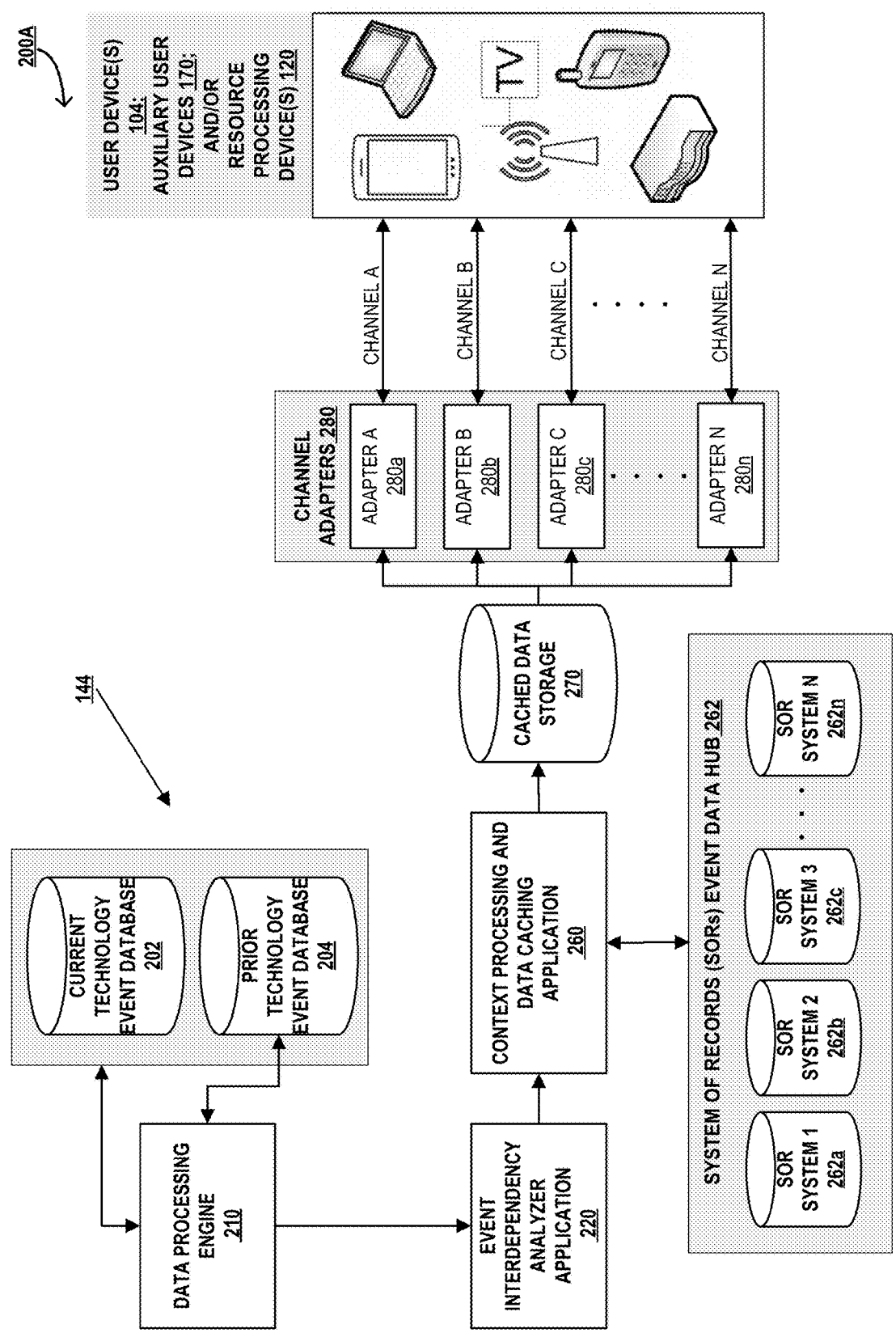
Figure 2B:
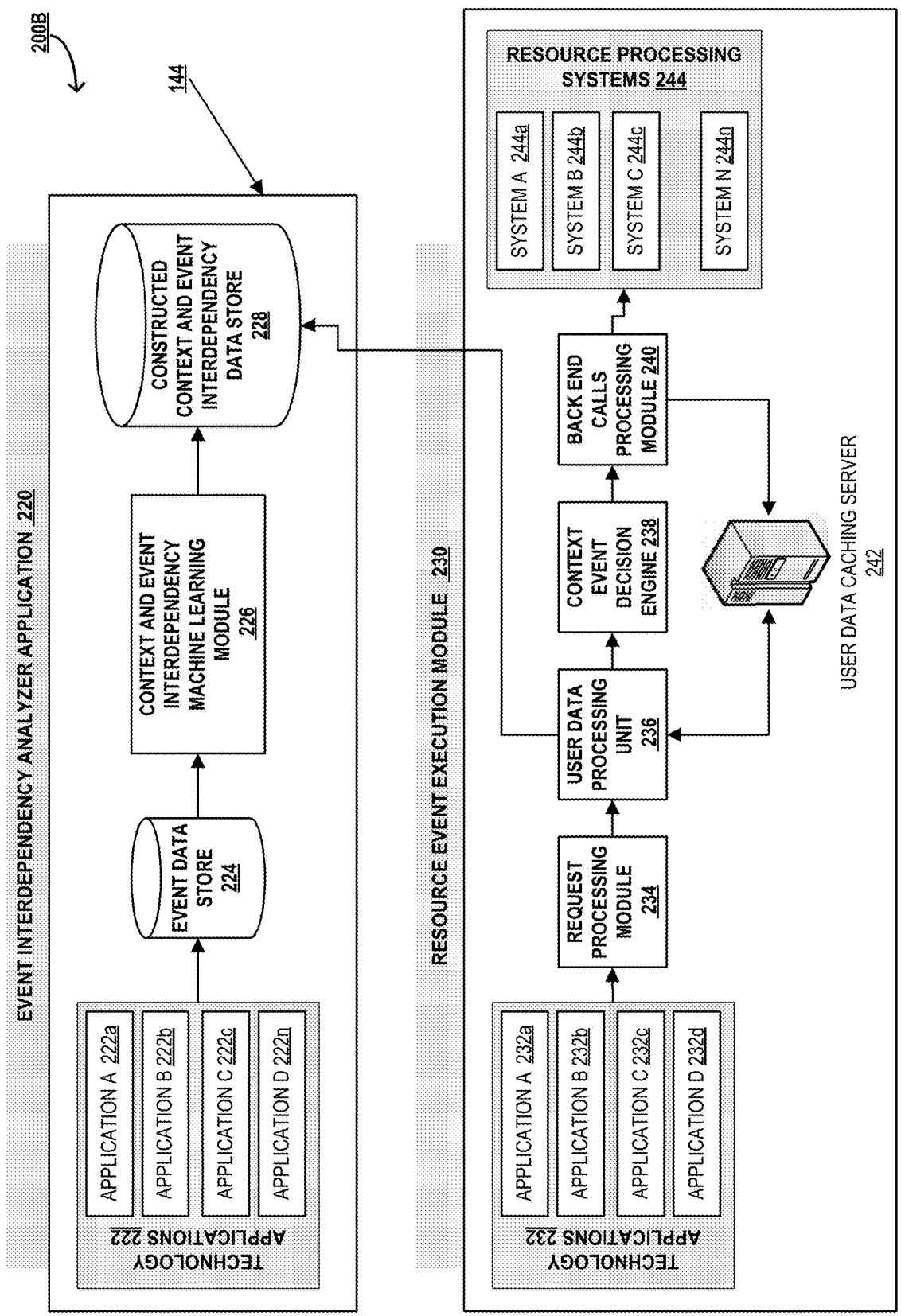
Figure 3A:
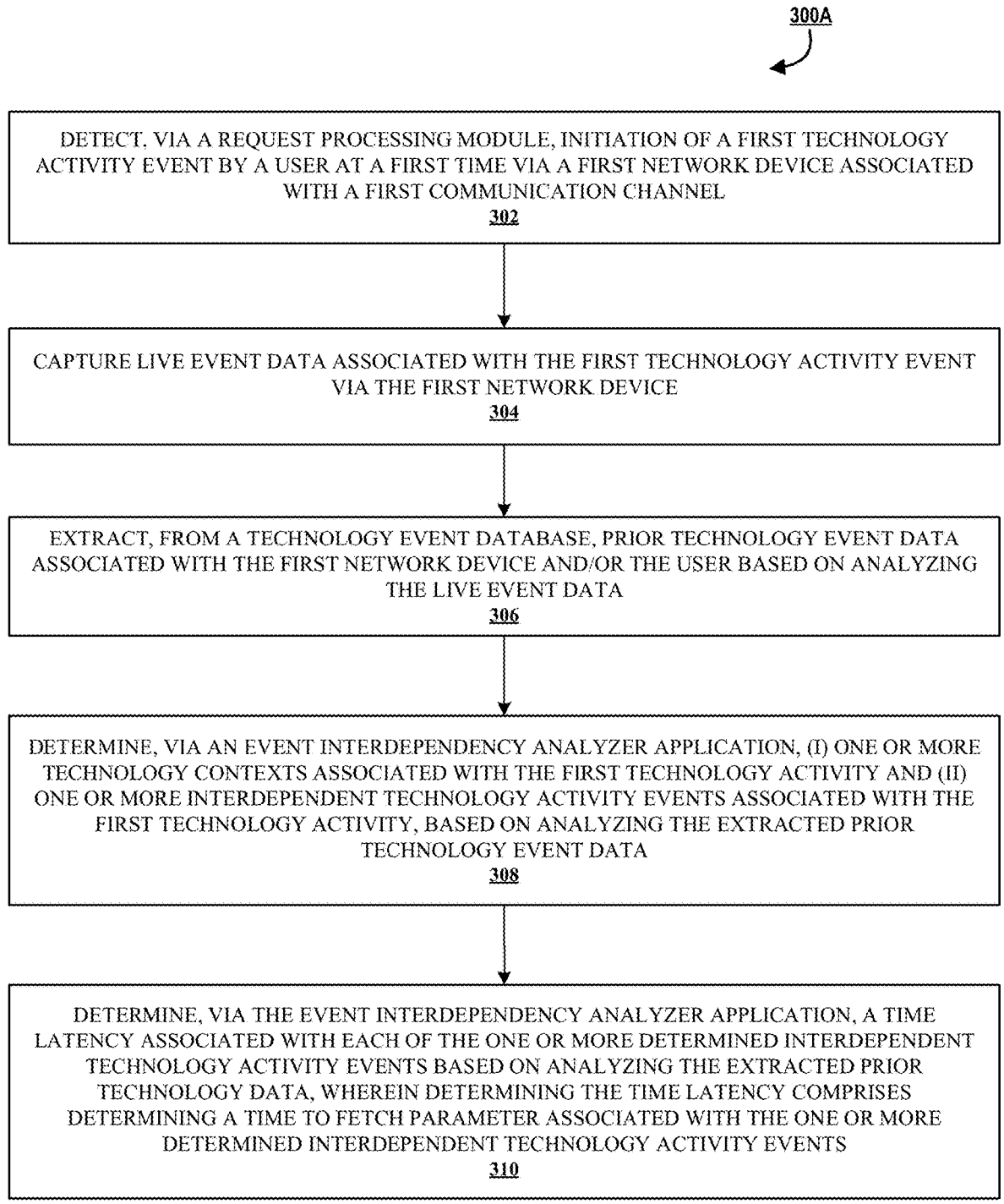
Figure 3B:
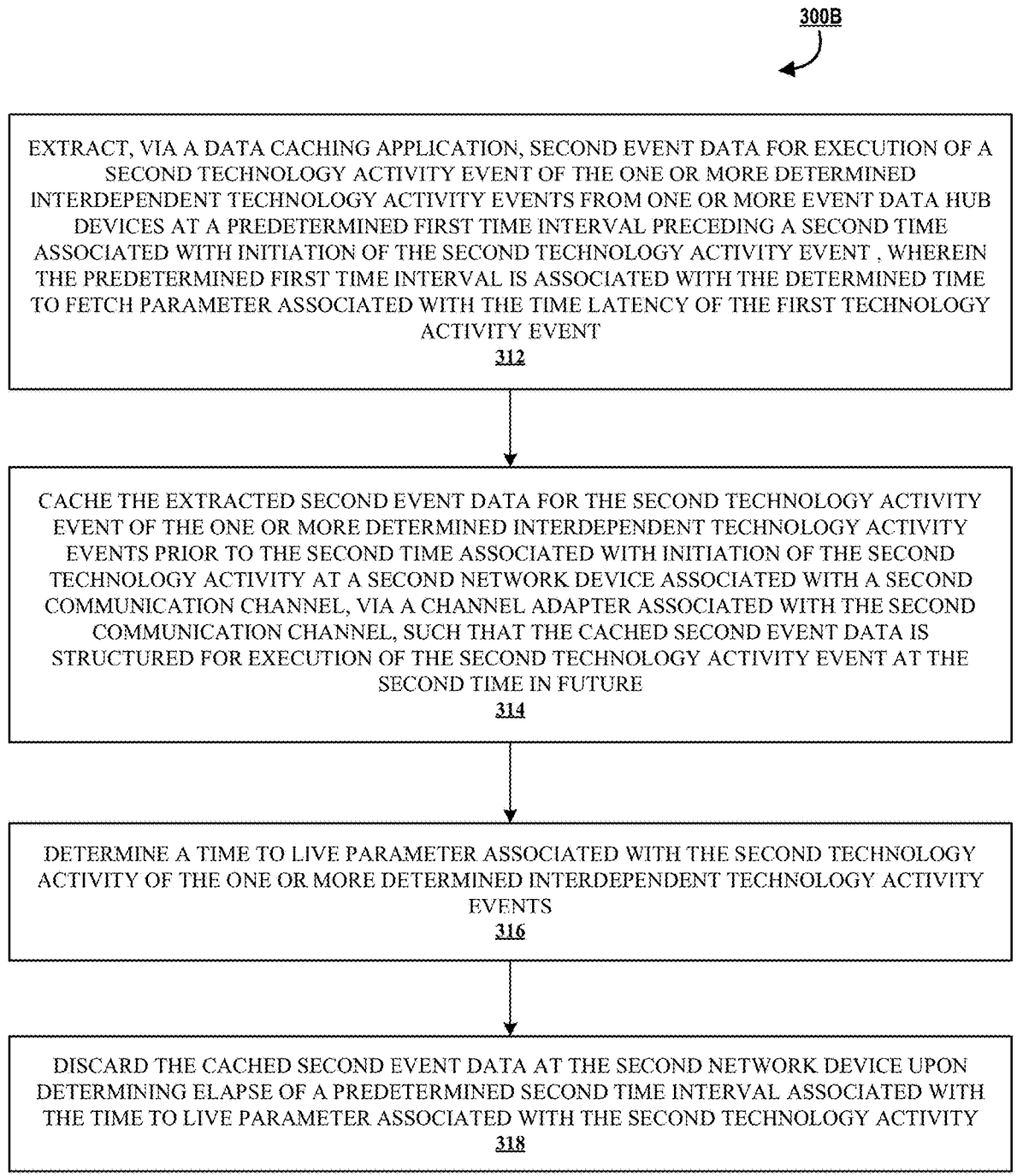
Figure 4:
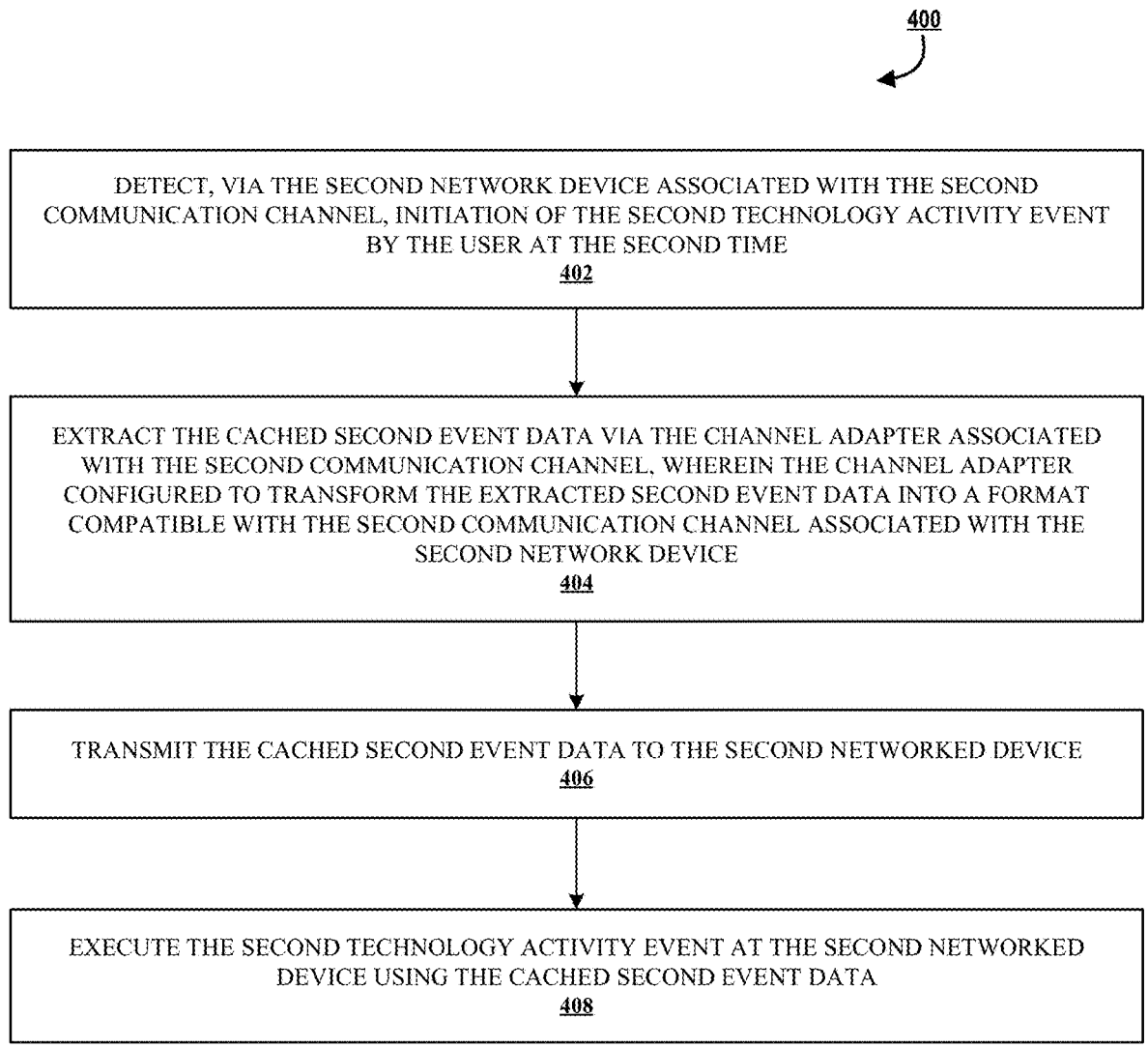

Having thus described embodiments of the invention in general terms, reference will now be made to the accompanying drawings, wherein:

FIG. 1 depicts a network environment 100 for dynamically adapted, time latency-based, cross channel data caching for performing electronic activities, in accordance with one embodiment of the present invention;

FIG. 2A depicts a schematic diagram 200A of a network environment for a cross-channel data caching application environment of FIG. 1 for dynamically adapted, time latency-based, cross channel data caching, in accordance with one embodiment of the present invention;

FIG. 2B depicts a schematic diagram 200B of a network environment for an event interdependency analyzer application environment of FIG. 2A, in accordance with one embodiment of the present invention;

FIG. 3A depicts a high level process flow 300A for dynamically adapted, time latency-based, cross channel data caching for performing electronic activities, in accordance with one embodiments of the present invention;

FIG. 3B depicts a high level process flow 300B for dynamically adapted, time latency-based, cross channel data caching for performing electronic activities in conjunction with FIG. 3A, in accordance with one embodiments of the present invention; and FIG. 4 depicts a high level process flow 400 for executing an interdependent activity using dynamically adapted, time latency-based, cross channel data caching, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" or "enterprise" as used herein may be any institution or establishment, associated with a network connected resource transfer platform, and particularly geolocation systems and devices. As such, the entity may be any institution, group, association, financial institution, merchant, establishment, company, union, authority or the like.

As described herein, a "user" is an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

In the instances where the entity is a resource entity or a merchant, financial institution and the like, a user may be an individual or entity with one or more relationships, affiliations or accounts with the entity (for example, the merchant, the financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, user information, or the like. The technology resource or account is typically associated with and/or maintained by an entity, and is typically associated with technology infrastructure such that the resource or account may be accessed, modified or acted upon by the user electronically, for example using or transaction terminals, user devices, merchant systems, and the like. In some embodiments, the entity may provide one or more technology instruments or financial instruments to the user for executing resource transfer activities or financial transactions. In some embodiments, the technology instruments/financial instruments like electronic tokens, credit cards, debit cards, checks, loyalty cards, entity user device applications, account identifiers, routing numbers, passcodes and the like are associated with one or more resources or accounts of the user. In some embodiments, an entity may be any institution, group, association, club, establishment, company, union, authority or the like with which a user may have a relationship. As discussed, in some embodiments, the entity represents a vendor or a merchant with whom the user engages in financial (for example, resource transfers like purchases, payments, returns, enrolling in merchant accounts and the like) or non-financial transactions (for resource transfers associated with loyalty programs and the like), either online or in physical stores.

As used herein, a "user interface" may be a graphical user interface that facilitates communication using one or more communication mediums such as tactile communication (such, as communication via a touch screen, keyboard, and the like), audio communication, textual communication and/or video communication (such as, gestures). Typically, a graphical user interface (GUI) of the present invention is a type of interface that allows users to interact with electronic elements/devices such as graphical icons and visual indicators such as secondary notation, as opposed to using only text via the command line. That said, the graphical user interfaces are typically configured for audio, visual and/or textual communication, and are configured to receive input and/or provide output using one or more user device components and/or external auxiliary/peripheral devices such as a display, a speaker, a microphone, a touch screen, a camera, a GPS device, a keypad, a mouse, and/or the like. In some embodiments, the graphical user interface may include both graphical elements and text elements. The graphical user interface is configured to be presented on one or more display devices associated with user devices, entity systems, auxiliary user devices, processing systems and the like.

An electronic activity, also referred to as a "technology activity", "technology activity event", or a "user activity", such as a "resource transfer" or "transaction", may refer to any activities or communication between a user or entity and the financial institution, between the user and the entity, activities or communication between multiple entities, communication between technology applications and the like. A resource transfer may refer to a payment, processing of funds, purchase of goods or services, a return of goods or services, a payment transaction, a credit transaction, or other interactions involving a user's resource or account. In the context of a financial institution or a resource entity such as a merchant, a resource transfer may refer to one or more of: transfer of resources/funds between financial accounts (also referred to as "resources"), deposit of resources/funds into a financial account or resource (for example, depositing a check), withdrawal of resources or finds from a financial account, a sale of goods and/or services, initiating an automated teller machine (ATM) or online banking session, an account balance inquiry, a rewards transfer, opening a bank application on a user's computer or mobile device, a user accessing their e-wallet, applying one or more coupons to purchases, or any other interaction involving the user and/or the user's device that invokes or that is detectable by or associated with the financial institution. A resource transfer may also include one or more of the following: renting, selling, and/or leasing goods and/or services (e.g., groceries, stamps, tickets, DVDs, vending machine items, and the like); making payments (e.g., paying monthly bills; and the like); loading money onto stored value cards (SVCs) and/or prepaid cards; donating to charities; and/or the like. Unless specifically limited by the context, a "resource transfer," a "transaction," a "transaction event," or a "point of transaction event," refers to any user activity (financial or non-financial activity) initiated between a user and a resource entity (such as a merchant), between the user and the financial instruction, or any combination thereof. In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a funds/resource transfer between account, funds/resource transfer as a payment for the purchase for a product, service, or the like from a merchant, and the like. Typical financial transactions or resource transfers include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures, and the like.

In accordance with embodiments of the invention, the term "user" may refer to a customer or the like, who utilizes an external apparatus such as a user device, for executing resource transfers or transactions. The external apparatus may be a user device (computing devices, mobile devices, smartphones, wearable devices, auxiliary devices, and the like), a payment instrument (credit cards, debit cards, checks, digital wallets, currency, loyalty points), and/or payment credentials (account numbers, payment instrument identifiers). In some embodiments, the user may seek to perform one or more user activities using a multi-channel cognitive resource application of the invention, which is stored on a user device (e.g., as a multi-channel cognitive resource user application mobile application of the user's smart phone). In some embodiments, the user may perform transactions by swiping payment instruments at a transaction terminal, for example, by swiping a magnetic strip of a credit card along a magnetic reader of a transaction terminal. In some embodiments, the transactions may be performed by wireless communication or "tapping" between the customer device and a transaction terminal. In accordance with some embodiments of the invention, the term "tap" or "tapping" may refer to bringing an external apparatus close to or within a predetermined proximity of the activity interface device or transaction terminal interface, or auxiliary user devices, so that information (such as encrypted tokens, financial resource/account identifiers, and the like) can be communicated wirelessly between the external apparatus and the devices using short range wireless transmission technology, such near-field communication (NFC) technology, radio-frequency (RF) technology, audio-frequency communication, or the like. Tapping may include physically tapping the user device against an appropriate portion of the auxiliary user device or the transaction terminal or it may include only waving or holding the user device near an appropriate portion of the auxiliary user device or the transaction terminal without making physical contact with the transaction terminal.

There has been a significant increase in the number of electronic activities, particularly online and mobile activities due to widespread use of smartphone, tablet computers, laptop computers, transaction terminals, and electronic computing devices in general. Performing electronic activities requires the devices to repeatedly fetch relevant data from backend servers, external databases/networks, and/or other backend systems/devices. However, fetching data from backend systems results in a time lag, causing delays in execution of the electronic activities. Some conventional systems employ data caching, in an attempt to reduce these delays. However, these conventional systems typically cache almost all provided data commencing since the time of the users' login, in its entirety. Conventional systems are neither able to determine the relevancy of the data for current activities, much less for future activities, nor envisage how long the data needs to be cached for, thereby resulting in large amounts of irrelevant cached data that is stored over extended time periods. However, caching such immense amounts of data causes severe burdens on data caching servers, such as heavy memory and processing loads. Moreover, the enormity of the amounts of the data being cached results in slow turnaround times for the searching and fetching relevant data, thereby impeding the very purpose of data caching. In addition, typically, the data cached by conventional systems is specific to a particular device, and conventional systems are not able to transform cached data across channels, causing further delays.

The present invention, as described in detail with respect to FIGS. 1 to 4, provides a novel dynamically adapted, time latency-based, cross channel data caching for performing electronic activities. Specifically, the present invention is not only structured for selective proactive data caching based on interdependency of electronic activities and transformation of cached data for transmission through a plurality of communication channels, for reducing memory and processing burdens on data caching servers and reducing turnaround time for activity execution, it is also structured for caching most current data at precise time to fetch parameters and retaining the data only until precise time to live parameters and discarding the data thereafter, as well, thereby precluding perpetual caching of data over extended time periods and also precluding prematurely caching data that is not current. The improvements provided by the present invention may result in immensely faster cache data operations, such as withing a few milliseconds, which would otherwise require multiple seconds or minutes in the absence of the present invention.

FIG. 1 illustrates a network environment 100 for dynamically adapted, time latency-based, cross channel data caching for performing electronic activities, in accordance with one embodiment of the present invention. As illustrated in FIG. 1, a caching technology system 106, is provided configured for dynamically adapted, time latency-based, cross channel data caching for performing electronic activities. Specifically, the cross-channel data caching application environment 144 of the caching technology system 106 is structured for selective proactive data caching based on interdependency of electronic activities and transformation of cached data for transmission through a plurality of communication channels, for reducing memory and processing burdens on data caching servers and reducing turnaround time for activity execution. The caching technology system 106 is operatively coupled, via a network 101 to one or more user devices 104, auxiliary user devices 170, resource processing devices 120, entity system(s) 180 (e.g., financial institution systems 180), entity databases 190, and other external systems/third-party servers not illustrated herein. In this way, the caching technology system 106 can send information to and receive information from multiple user devices 104, auxiliary user devices 170, and/or resource processing devices 120, via network 101.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101. The network 101 is configured to establish an operative connection between otherwise incompatible devices, for example establishing a communication channel, automatically and in real time, between the one or more user devices 104 and one or more of the auxiliary user devices 170 and/or resource processing devices 120, (for example, based on receiving a user input, or when the user device 104 is within a predetermined proximity or broadcast range of the auxiliary devices 170 and/or resource processing devices 120), as illustrated by communication channel 101a. Therefore, the system, via the network 101 may establish, operative connections between otherwise incompatible devices, for example by establishing a communication channel 101a between the one or more user devices 104 and the auxiliary user devices 170 and/or resource processing devices 120. In this regard, the network 101 (and particularly the communication channels 101a) may take the form of contactless interfaces, short range wireless transmission technology, such near-field communication (NFC) technology, near-field low energy communication, audio frequency (AF) waves, wireless personal area network, radio-frequency (RF) technology, and/or other suitable communication channels. Tapping may include physically tapping the external apparatus, such as the user device 104, against an appropriate portion of the auxiliary user device 170 and/or resource processing devices 120, or it may include only waving or holding the external apparatus near an appropriate portion of the auxiliary user device without making physical contact with the auxiliary user device and/or resource processing devices 120.

In some embodiments, the user 102 is an individual that wishes to conduct one or more electronic activities or technology activity events with resource entities, for example using the user device 104. As such, in some instances, the user device may have multiple user applications 122 stored/installed on the user device 104 and the memory device 116 in particular. In some embodiments, the user application 122 is used to conduct one or more electronic activities or technology activity events with resource entities. In some embodiments the user application 122 may refer to a third party application or a user application stored on a cloud used to access the caching technology system 106 and/or the auxiliary user device 170 through the network 101, communicate with or receive and interpret signals from auxiliary user devices 170, and the like. The user 102 may subsequently navigate through the interface, perform one or more searches or initiate one or more activities or resource transfers using a user interface provided by the user application 122 of the user device 104. In some embodiments, the user 102 may be routed to a particular destination using the user device 104. In some embodiments, a purchase or a transaction may be made by the user 102 using the user device 104. In some embodiments the auxiliary user device 170 requests and/or receives additional information from the caching technology system 106, entity system 180 and/or the user device 104 for authenticating the user and/or the user device, determining appropriate transaction queues, performing the transactions and other functions.

FIG. 1 also illustrates the user device 104. The user device 104, herein referring to one or more user devices, wherein each device may generally comprise a communication device 110, a display device 112, a geo-positioning device 113, a processing device 114, and a memory device 116. Typically, the user device 104 is a computing system that allows a user 102 to interact with other systems to initiate or to complete activities, resource transfers, and transactions for products, and the like. The processing device 114 is operatively coupled to the communication device 110 and the memory device 116. The processing device 114 uses the communication device 110 to communicate with the network 101 and other devices on the network 101, such as, but not limited to the entity system 180, the auxiliary user device 170, resource processing devices 120, and the caching technology system 106. As such, the communication device 110 generally comprises a modem, server, or other device for communicating with other devices on the network 101. In some embodiments the network 101 comprises a network of distributed servers. In some embodiments, the processing device 114 may be further coupled to a display device 112, a geo-positioning device 113, and/or a transmitter/receiver device, not indicated in FIG. 1. The display device 112 may comprise a screen, a speaker, a vibrating device or other devices configured to provide information to the user. In some embodiments, the display device 112 provides a presentation of the user interface of the user application 122. The geo-positioning device 113 may comprise global positioning system (GPS) devices, triangulation devices, accelerometers, and other devices configured to determine the current geographic location of the user device 104 with respect to satellites, transmitter/beacon devices, telecommunication towers and the like. In some embodiments the user device 104 may include authentication devices like fingerprint scanners, bio-monitors, microphones and the like that are configured to receive bio-metric authentication credentials from the user.

The user device 104 comprises computer-readable instructions 124 stored in the memory device 116, which in one embodiment includes the computer-readable instructions 124 of the user application 122. In this way, users 102 may authenticate themselves, initiate activities, and interact with or receive and decode signals from the auxiliary user devices 170 and/or resource processing devices 120, communicate with the caching technology system 106, authorize a transaction, and/or complete a transaction using the central user interface of the user device 104. As discussed previously, the user device 104 may be, for example, a desktop personal computer, a mobile system, such as a cellular phone, smart phone, personal data assistant (PDA), laptop, wearable device, a smart TV, a smart speaker, a home automation hub, augmented/virtual reality devices, or the like. The computer readable instructions 124 such as computer readable/executable code of the multi-channel cognitive resource user application 122, when executed by the processing device 114 are configured to cause the user device 104 and/or processing device 114 to perform one or more steps described in this disclosure, or to cause other systems/devices to perform one or more steps described herein.

The resource processing devices 120 or transaction terminals as used herein may refer to one or more electronic devices that facilitate user transactions or activities. In this regard the resource processing devices 120 can comprise Automated Teller Machines (ATMs), resource terminals or Point of sale devices (POS), vending machines, checkout registers, ticket vending machines, automated retail transaction devices, banking terminals in a financial institution and other transaction terminals that involve financial transactions in one form or another. In some embodiments the resource processing device 120 refers to devices that facilitate execution of non-financial transactions or activities, for example, check-in terminals for various industries, for example: hospitality, travel, and the like, information kiosks and other transaction terminals that do not involve a user performing a financial transaction via the transaction terminal. In some embodiments the resource processing devices 120 facilitate execution of both financial and non-financial transactions/activities. In some embodiments, resource processing devices 120 may refer to user devices that facilitate financial and/or non-financial transactions, such as laptop computers, tablet computers, smartphones, wearable devices, personal digital assistants (PDAs), and other portable or stationary computing devices. In some embodiments, the resource processing devices 120 may be owned, operated and/or otherwise associated entities and are installed at suitable locations, such that the user can travel to the location of the resource processing device to execute transactions. In some embodiments, the resource processing device 120 may be owned, operated and/or otherwise associated with an entity, such as a financial institution. In some embodiments, the resource processing devices 120 may be owned, operated and/or otherwise associated with the user. The embodiments described herein may refer to the initiation and completion of an electronic activity, a user activity or a transaction.

As illustrated by FIG. 1, the resource processing device 120 may comprise an ATM 120*a*, a resource terminal 120*b* (e.g., a point of sale terminal 120*b*), a user device 120*c* (such as one or more user device 104 and/or one or more auxiliary user devices 170), vending machines and/or other devices that are configured to facilitate the user activity. The user device 120*c* may be one of the user devices 104 and may comprise a mobile communication device, such as a cellular telecommunications device (i.e., a smart phone or mobile phone), a computing device such as a laptop computer, a personal digital assistant (PDA), a mobile Internet accessing device, or other mobile device including, but not limited to portable digital assistants (PDAs), pagers, mobile televisions, entertainment devices, laptop computers, cameras, video recorders, audio/video player, radio, GPS devices, any combination of the aforementioned, or the like. The resource processing device 120 may include a communication device, a processing device, a user interface, an authentication device and a memory device having an authentication application/module, a resource datastore and one or more processing applications stored therein.

In some embodiments, the caching technology system 106 (also referred to as the caching technology system environment 106) comprises a plurality of networked devices, systems, applications, an electronic communication generating and cross-channel data caching application environment 144 (detailed in FIGS. 2A and 2B) and/or servers associated with technology infrastructure of an entity, in operative communication, as illustrated in FIGS. 2A and 2B described later on. As further illustrated in FIG. 1, the caching technology system 106 generally comprises a communication device 136, at least one processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the entity systems 180, auxiliary user devices 170, resource processing devices 120, and/or the user device 104. The processing device 138 uses the communication device 136 to communicate with the network 101 and other devices of the entity's technology infrastructure, such as, but not limited to plurality of networked devices, systems, technology applications, an electronic communication generating and cross-channel data caching application environment 144 (detailed in FIGS. 2A and 2B) and/or servers that may be located across various geographical locations, e.g., via an entity network (not illustrated). As such, the communication device 136 generally comprises a modem, server, wireless transmitters, or other devices for communicating with devices on the network 101. The memory device 140 typically comprises a non-transitory computer readable storage medium, comprising computer readable/executable instructions/code, such as the computer-readable instructions 142, as described below.

As further illustrated in FIG. 1, the caching technology system 106 comprises computer-readable instructions 142 or computer readable program code 142 stored in the memory device 140, which in one embodiment includes the computer-readable instructions 142 of a cross-channel data caching application 144 or a cross-channel data caching application environment 144. The computer readable instructions 142, when executed by the processing device 138 are configured to cause the system 106/processing device 138 to perform one or more steps described in this disclosure to cause out systems/devices (such as the user device 104, the user application 122, resource processing devices 120, entity system 180, entity database 190, and the like) to perform one or more steps described herein. In some embodiments, the memory device 140 includes a data storage for storing data related to user transactions and resource entity information, but not limited to data created and/or used by the cross-channel data caching application 144. The cross-channel data caching application 144, when operated by the processing device 138 is structured for dynamically adapted, time latency-based, cross channel data caching for performing electronic activities.

FIG. 1 further illustrates one or more auxiliary user devices 170, in communication with the network 101. The auxiliary user devices may comprise peripheral devices such as speakers, microphones, smart speakers, and the like, display devices, a desktop personal computer, a mobile system, such as a cellular phone, smart phone, personal data assistant (PDA), laptop, wearable device, a smart TV, a smart speaker, a home automation hub, augmented/virtual reality devices, or the like. In some embodiments, the structure and/or functioning of the auxiliary user devices 170 is substantially similar to that of the user device(s) 104, while in other embodiments, the auxiliary user devices 170 supplement/enhance the structure and/or functioning of the user device(s) 104.

FIG. 2A depicts a schematic diagram 200A of a network environment for a cross-channel data caching application environment 144 of FIG. 1 for dynamically adapted, time latency-based, cross channel data caching, in accordance with one embodiment of the present invention. FIG. 2B depicts a schematic diagram 200B of a network environment for an event interdependency analyzer application 220 environment of FIG. 2A, in accordance with one embodiment of the present invention. The cross-channel data caching application environment 144 is structured for dynamically adapted, time latency-based, cross channel data caching for performing electronic activities. The cross-channel data caching application environment 144 is also structured for selective proactive data caching based on interdependency of electronic activities and transformation of cached data for transmission through a plurality of communication channels, for reducing memory and processing burdens on data caching servers and reducing turnaround time for activity execution.

As illustrated by FIG. 2A, the cross-channel data caching application environment 144 comprises a data processing engine 210. The data processing engine 210 is in operative communication with one or more technology event databases, i.e., a current technology event database 202, and a prior technology event database 204. The current technology event database 202 typically comprises or stores most recent or current activity event data associated with the user, e.g., for activity events that are still being processed. In some instances, the current technology event database 202 comprises or stores captured live event data associated with the first technology activity event via the first network device. The prior technology event database 204 typically comprises prior technology event data associated with prior or historical activity event associated with the first network device and/or the user. The data processing engine 210 may detect or receive a signal indicating the detection (e.g., from a request processing module) of initiation of a first technology activity event by a user at a first time via a first network device associated with a first communication channel. In response, the data processing engine 210 may parse the technology event database(s) and extract relevant data. In some embodiments, the data processing engine 210 may extract prior technology event data associated with the first network device and/or the user, from the prior technology event database 204, based on analyzing the live event data.

Moreover, the data processing engine 210, e.g., together with an event interdependency analyzer application 220, is structured to determine one or more technological contexts of a user action/activity or technology activity event. The technology contexts may comprise an intent of the user for performing the activity event, technology resources involved, activity timeframes, and/or the like. The data processing engine 210 is structured to transmit the determined technological contexts to the event interdependency analyzer application 220.

The event interdependency analyzer application 220 may receive the one or more technology contexts associated with the first technology activity from the data processing engine 210. The event interdependency analyzer application 220, via its machine learning components, may then determine one or more interdependent technology activity events associated with the first technology activity, based on analyzing the extracted prior technology event data extracted from the prior technology event database 204. The event interdependency analyzer application 220 is structured to analyze interdependency between events.

As discussed above, the data processing engine 210 may detect or receive a signal indicating the detection (e.g., from a request processing module) of initiation of a first technology activity event by a user at a first time via a first network device associated with a first communication channel. As a non-limiting example, the first technology activity event may comprise the user receiving notification of a deposit of a resource value (e.g., an amount, salary, etc.) at a first resource (e.g., account) at a first user device such as smartphone. As another non-limiting example, the first technology activity event may comprise receiving a telephone call from the user at an entity system for user support from a first user device such as smartphone. Here, the event interdependency analyzer application 220 may first parse the prior technology event data to determine a prior first technology activity event that matches the first technology activity. The system may parse prior user activity data of numerous prior activities. The system may then identify a prior first technology activity event associated with the first networked device in the user activity log, that is substantially similar to the current first technology activity event. For example, the event interdependency analyzer application 220 may identify any past activity events of the user receiving deposits in the past, or past calls to the entity system for user support from the user. Next, the event interdependency analyzer application 220 may identify one or more prior second technology activities from the prior technology event data, e.g., (i) which succeeded the prior first technology activity event, and/or (ii) which occurred which a predetermined time window around the time of the prior first technology activity event. For example, the event interdependency analyzer application 220 may identify past technology activity events that were performed by the user within a predetermined time interval (e.g., 2 hours, 1 day, etc.) succeeding the occurrence of any past activity events of the user receiving deposits in the past, or past calls to the entity system for user support from the user. Next, the event interdependency analyzer application 220 may determine which of the identified one or more prior second technology activities are mutually interdependent on/with the prior first technology activity event. Here, the event interdependency analyzer application 220 may ascertain that one or more of the identified prior second technology activities are mutually interdependent on/with the prior first technology activity event, based on determining that (i) the one or more prior second technology activities succeeded the prior first technology activity event, and that (ii) the one or more prior second technology activities comprise an event nexus with the prior first technology activity event. The event interdependency analyzer application 220 may then determine/designate the one or more of the identified prior second technology activities that are mutually interdependent on/with the prior first technology activity event, as the one or more interdependent technology activity events for the first technology activity event currently being performed.

Determining the "event nexus" between the prior first technology activity event and the one or more prior second technology activities may refer to determining/constructing/detecting a relationship, an overlap, a commonality, etc., e.g., between otherwise temporally disparate first and second activity events. In some instances, the event interdependency analyzer application 220 may determine a "event nexus" between the prior first technology activity event and the one or more prior second technology activities based on a relationship, an overlap, a commonality, etc., between technical characteristics or event data of these activity events, such as activity type information, temporal activity information, positional/geographic information, prior activity performance information, and/or future activity schedule information, and/or the like.

Continuing with the previous example, for a first technology activity event of the user receiving a deposit of a resource value (e.g., an amount, salary, etc.) at a first resource (e.g., account), the event interdependency analyzer application 220 may determine that a prior second technology activity of a user viewing data associated with a second resource after a time interval of 1 day after a prior first technology activity event of the user previously receiving a deposit of a resource value (e.g., an amount, salary, etc.) at a first resource (e.g., account), as not being interrelated with a prior first technology activity event. Here, the event interdependency analyzer application 220 may further determine that another prior second technology activity of the user performing a resource transfer associated with a utility bill within a time interval of 5 hours of the prior first technology activity event of the user previously receiving a deposit of a resource value (e.g., an amount, salary, etc.) at a first resource (e.g., account), as being interrelated with the prior first technology activity event and also the first technology activity event. Similarly, as another example, the event interdependency analyzer application 220 may further determine that prior second technology activities of (i) the user logging into a webpage/account associated with user support using a second device such as a user laptop computer, and/or (ii) the user initiating a text-based chat with a user support representative using a second device such as a user laptop computer within a time interval of 15 minutes of the prior first technology activity event of the user previously placing telephone call to an entity system for user support from a first user device such as smartphone (e.g., with the call being unsuccessful due to call being disconnected before resolution of an item), as being interrelated with the prior first technology activity event, as well as the first technology activity event of the user currently placing telephone call to an entity system for user support from a first user device such as smartphone (e.g., with the call being unsuccessful due to call being disconnected before resolution of an item).

As yet other non-limiting examples, for a current first technology activity event of the purchasing tickets to a sporting event, the system may identify a prior first technology activity event previously conducted by the user of purchase of tickets for a musical event at a prior date/time A. The system may further identify a prior second technology activity associated from the user activity log. Continuing with the previous example, the system may identify and parse through prior user activities that occurred after the prior first technology activity event for a predetermined time interval succeeding the prior first technology activity event. Here, the system may identify that the musical event occurred at a prior date/time B succeeding date/time A, and determine the predetermined time interval to be the time period between the data/time A and date/time B, and analyze activities conducted by the user therein. In some embodiments, the system typically (i) determines that the prior second technology activity comprises the event nexus with the prior first technology activity and (ii) selects the prior second technology activity as the interdependent technology activity event associated with the current first technology activity event. Continuing with the previous example, the system may identify a prior second activity that the user previously purchased parking tickets a date/time between times A and B, for parking a geographic location at the event using a particular device. In response to determining that the prior first activity event and the currently being analyzed first technology activity event are both resource type events, the system may determine an interdependent technology activity event of purchasing parking tickets as well. The system may further customize the interdependent technology activity event of purchasing parking tickets to the location and time of the currently being analyzed first technology activity event. Here, the cached data for the interdependent technology activity event is constructed to facilitate obtaining the parking tickets for a time and a location corresponding to the event of the first technology activity event.

The event interdependency analyzer application 220 is further configured to determine (i) what data is required to be cached for the one or more interdependent technology activity events, (ii) the time to fetch parameter for retrieval (e.g., when this data needs to be fetched for most current data to be available for the interdependent activity event), and (iii) where this data needs to be fetched from. First, the event interdependency analyzer application 220 may determine what data is likely necessary for performing the interdependent technology activity event, and what data may be cached therefor to expedite the activity event and reduce processing and memory loads and delays. For example, the event interdependency analyzer application 220 may determine resource data (e.g., account data), billing information, etc., as the cached data for an interdependent technology activity event of an outgoing resource transfer associated with a utility bill. For example, the event interdependency analyzer application 220 may determine login information, user information, entity item information, etc., as the cached data for interdependent technology activity events of the user logging into a webpage/account associated with user support using a second device such as a user laptop computer, and/or (ii) the user initiating a text-based chat with a user support representative using a second device such as a user laptop computer. For example, the event interdependency analyzer application 220 may determine login information, billing information, parking location information, availability information during the required time interval, etc., as the cached data for an interdependent technology activity event of the user purchasing parking tickets for the sporting event.

Second, the event interdependency analyzer application 220 may determine a "time latency" or "time latency parameter" associated with each of the one or more determined interdependent technology activity events based on analyzing the extracted prior technology data. Here, the "time latency" or "time latency parameter" may refer to the time interval or the likely time interval between the first technology activity event and the subsequent interdependent technology activity event. In other words, the time latency" or "time latency parameter" may refer to how long after the occurrence of the first technology activity event, will the interdependent technology activity event be initiated. The event interdependency analyzer application 220 may determine this based on the corresponding time interval between the prior first technology activity event and the subsequent prior second technology activity, described previously. Here, the system may personalize the time latency for individual users. For example, for a first user may have a time latency of around 25 minutes for initiating an interdependent technology activity event of a text-based chat with a user support representative using a second device such as a user laptop computer after end of a first technology activity event of the user previously placing telephone call to an entity system for user support from a first user device such as smartphone (e.g., with the call being unsuccessful due to call being disconnected before resolution of an item). On the other hand, a second user may have reduced a time latency of around 10 minutes for initiating an interdependent technology activity event of a text-based chat with a user support representative using a second device such as a user laptop computer after end of a first technology activity event of the user previously placing telephone call to an entity system for user support from a first user device such as smartphone (e.g., with the call being unsuccessful due to call being disconnected before resolution of an item).

Next, the event interdependency analyzer application 220 may further determine a "time to fetch" parameter based on the determined time latency. The time to fetch parameter may refer to the optimal time for fetching the data for caching for the interdependent technology activity event, without the data becoming obsolete by the time the interdependent technology activity event is performed. In other words, the time to fetch parameter indicates how long before the interdependent technology activity event does the data for caching needs to be fetched, such that the most current data is available at the time of performing the interdependent technology activity event, without the data becoming obsolete by the time the interdependent technology activity event is performed. The time latency parameter and the time to fetch parameter are structured to preclude data from being cached too far in advance of the interdependent technology activity event, thereby ensuring that cache memory is not overloaded with large amounts of data for prolonged time periods, and ensuring that the most current data is available at the time of performing the activity event. Data that is cached too far in advance of the interdependent technology activity event may undesirably become obsolete or irrelevant and thereby be unusable or cause errors in performing the subsequent interdependent technology activity event. Typically, the time to fetch parameter is determined based on the time latency parameter. For example, for an interdependent technology activity having a time latency of around 6 hours after occurrence of the first technology activity event, the system may determine a time to fetch parameter of 5.8 hours after the first technology activity event or 0.2 hours preceding the interdependent technology activity.

Third, the event interdependency analyzer application 220 may determine which systems the data to be cached needs to be extracted from. As illustrated, the cross-channel data caching application environment 144 comprises and/or is in operative communication with a system of records (SORs) event data hub 262 having one or more system of record (SOR) systems (SOR system-1, 262a, SOR system-2, 262b, SOR system-3, 262c, . . . , and/or SOR system-N, 262n). Here, the event interdependency analyzer application 220 may determine which system of record (SOR) systems (SOR system-1, 262a, SOR system-2, 262b, SOR system-3, 262c, . . . , SOR system-N, 262n) of the system of records (SORs) event data hub 262 comprise the relevant data to be cached. The event interdependency analyzer application 220 may determine which of the SOR event hub systems 262a to 262n comprise the relevant data for caching for execution of the one or more determined interdependent technology activity events.

Specifically, the event interdependency analyzer application 220, together with a context processing and data caching application 260, is structured to extract/retrieve the relevant data to be cached from the respective system of record (SOR) systems (SOR system-1, 262a, SOR system-2, 262b, SOR system-3, 262c, . . . , SOR system-N, 262n) of the system of records (SORs) event data hub 262, in accordance with the time to fetch parameter. The context processing and data caching application 260 may store the retrieved data to be cached, e.g., temporarily, at the cached data storage 270. The cached data storage 270 may then transmit the cached data to one or more channel adapters 280 (channel adapter A 280a for communication channel A, channel adapter B 280b for communication channel B, channel adapter C 280c for communication channel C, . . . , and/or channel adapter N 280n for communication channel N) in accordance to the communication channel it needs to be transmitted to. Here, each channel adapter 280 (channel adapter A 280a, channel adapter B 280b, channel adapter C 280c, . . . , and/or channel adapter N 280n) is structured for transforming the extracted cached data from the cached data storage 270 into a format compatible with is respective communication channel. For example, the interdependent technology activity may be associated with a third device associated with a communication channel C having an adapter C 280c. In other words, the system may cache the extracted second event data for the a determined interdependent technology activity event (e.g., a second technology activity event) prior to the second time associated with initiation of the second technology activity at a second network device associated with a second communication channel, via a channel adapter associated with the second communication channel, such that the cached second event data is structured for execution of the second technology activity event at the second time in future. In this way the system customizes/transforms the cached data to be compatible with the channel/device of the interdependent technology activity. Moreover, the cross-channel data caching of the present invention allows for cache data to be utilized across-channels while being compatible with the required channel. Moreover, the cross-channel data caching of the present invention allows for caching of data for an interdependent activity at a second channel/device based on a first activity at a first channel/device. The cached data may then be utilized for performing the interdependent technology activity events at the respective user devices 104, auxiliary user devices 170 and/or resource processing devices 120.

The event interdependency analyzer application 220 is further configured to determine a time to live parameter that relates to how long the cached data is stored before it is discarded. Moreover, the time to live parameter is customized and tailored to the specific user and the specific interdependent technology activity. For example, the time to live parameter may be determined to be 3 hours for a second technology activity event of the one or more determined interdependent technology activity events, and 40 minutes for a third technology activity event of the one or more determined interdependent technology activity events, based on analyzing the prior activity event data and data associated with the particular interdependent technology activity event (e.g., time duration for processing the activity event). The cached data may be erased from the cached data storage 270 upon elapse of the time to live parameters, e.g., irrespective of whether the data has been utilized for performing the interdependent technology activity events, thereby preventing undesirable burdens on cache memory devices due to perpetual or long-term storage of likely unnecessary cached data. The time to live parameter may be determined using a function that processes variables such as a context severity (e.g., intent severity), technology context of the interdependent technology activity events, user activity information/data, and/or the like. In some embodiments, the context severity may refer to a probability score of the interdependent technology activity event occurring, prior repetitions/reoccurrences of user activities, and/or the like. A non-limiting example of the function for the time to live parameter is provided below:

$$(\text{Time to live parameter}) = f(\text{technology context}_{interdependency}, \text{context severity}, \text{user activity data})$$

Now referring to FIG. 2B, the event interdependency analyzer application 220 may comprise and/or may be in operative communication with a plurality of technology application 222 such as application A 222a, application B 222b, application C 222c, ..., and/or application N 222n. For example, the application A 222a may comprise an online banking application, the application B 222b may comprise mobile banking application, the application C 222c may comprise an entity application, the application N 222n may comprise an entity contact center application, and/or the like. One or more of the technology applications 222 may be invoked when the customer initiates of a first technology activity event by a user at a first time via a first network device associated with a first communication channel. The live event data associated with the first technology activity event may be retrieved via the technology applications 222 and stored at the current technology event database 202, in some embodiments. Moreover, live event data associated with the first technology activity event, along with determined technological contexts from the data processing engine 210, and prior technology event data associated with the first network device and/or the user based on analyzing the live event data may then be transmitted to a context and event interdependency machine learning module 226. The context and event interdependency machine learning module 226 may analyze the prior technology event data associated with the first network device and/or the user based on analyzing the live event data, the determined technological contexts, and live event data associated with the first technology activity.

Here, the context and event interdependency machine learning module 226 may determine (i) one or more technology contexts associated with the first technology activity and (ii) one or more interdependent technology activity events associated with the first technology activity, based on analyzing the extracted prior technology. Here, for example, for each first technology activity event (F1, F2, F3, ..., Fn), the context and event interdependency machine learning module 226 may determine one or more interdependent second technology activity events (S1, S2, S3, ..., Sn). For example, for a first technology activity event F1 of a user logging in to an application and/or depositing a check, the system may determine a interdependent second technology activity events S1 of performing a resource transfer associated with transferring an amount from the checking account to a savings account and another interdependent second technology activity events S2 of performing a resource transfer associated with paying a utility bill. The determined one or more technology contexts and the one or more interdependent technology activity events may be stored, e.g., temporarily, at the constructed context and event interdependency data store 228.

FIG. 2B further illustrates a resource event execution module 230, which may comprise and/or may be in operative communication with a plurality of technology application 232 such as application A 232a, application B 232b, application C 232c, ..., and/or application N 232n, which may be the technology applications 222 or may be substantially similar to the technology applications 222 described previously. As such, for example, the application A 232a may comprise an online banking application, the application B 232b may comprise mobile banking application, the application C 232c may comprise an entity application, the application N 232n may comprise a entity contact center application, and/or the like. One or more of the technology applications 232 may be invoked by the request processing module 234 when the customer initiates of a first technology activity event by a user at a first time via a first network device associated with a first communication channel. The user data processing unit 236 may then fetch the previous predicted technology context and transmit it to the context event decision engine 238. The context event decision engine 238 may determine what data is required to be fetched from the backend systems (e.g., system of record (SOR) systems). For example, if the determined technology contexts related to the resource instruments such as credit card systems, the back-end calls processing module 240 may only fetch data from a credit card processing system, e.g., via a user data caching server 242. The back-end calls processing module 240 may transmit the technology context, the interdependent events, and/or the like to one or more resource processing systems 244 (system A 244a, system B 244b, system C 244c, ..., system N 244n). In this manner, the data will be maintained and will be called back to the user data processing unit 236 so that it will be rendered via particular channel.

FIG. 3A depicts a high level process flow 300A for dynamically adapted, time latency-based, cross channel data caching for performing electronic activities, in accordance with one embodiments of the present invention. FIG. 3B depicts a high level process flow 300B for dynamically adapted, time latency-based, cross channel data caching for performing electronic activities in conjunction with FIG. 3A, in accordance with one embodiments of the present invention. In some embodiments, the processing device 138 of the caching technology system 106 may execute the computer-readable program code/instructions 142 to perform one or more steps of the process flow 300A-300B. The caching technology system 106 may perform some or all of the steps of the process flow 300A-300B, or cause other devices (entity system 180, entity database 190, and/or other devices communicating via network 101) to perform some or all of the steps of the process flow 300A-300B. The process flow 300A-300B is structured for dynamically adapted, time latency-based, cross channel data caching for performing electronic activities. Here, the process flow 300A-300B selective proactive data caching based on interdependency of electronic activities and transformation of cached data for transmission through a plurality of communication channels, for reducing memory and processing burdens on data caching servers and reducing turnaround time for activity execution.

Initially, at block 302, the system via a request processing module, may detect initiation of a first technology activity event by a user at a first time via a first network device associated with a first communication channel. The first networked device may be a user device 104, a user auxiliary device 170, a resource processing device 120, and/or the like. As a non-limiting example, the first technology activity event may comprise the user receiving notification of a deposit of a resource value (e.g., an amount, salary, etc.) at a first resource (e.g., account) at a first user device such as smartphone, and/or a user performing a check deposit at an ATM. As another non-limiting example, the first technology activity event may comprise receiving a telephone call from the user at an entity system for user support from a first user device such as smartphone. As yet another non-limiting example, the first technology activity event may comprise the user initiating a purchase at a resource processing device such as a resource terminal.

Next, at block 304, the system may capture live event data associated with the first technology activity event via the first network device. As discussed above, the data processing engine 210 may detect or receive a signal indicating the detection (e.g., from a request processing module) of initiation of a first technology activity event by a user at a first time via a first network device associated with a first communication channel. In response, the system may capture activity parameters associated with the first technology activity event.

The system may further extract prior technology event data associated with the first network device and/or the user based on analyzing the live event data, from the prior technology event database 204, as indicated by block 306. As discussed previously with respect to FIGS. 2A-2B, the system, via the data processing engine 210 may parse the technology event database(s) and extract relevant data. In some embodiments, the data processing engine 210 may extract prior technology event data associated with the first network device and/or the user, from the prior technology event database 204, based on analyzing the live event data.

Next at block 308, the system via the event interdependency analyzer application 220 may determine (i) one or more technology contexts associated with the first technology activity and (ii) one or more interdependent technology activity events associated with the first technology activity, based on analyzing the extracted prior technology. The technology contexts may comprise an intent of the user for performing the activity event, technology resources involved, activity timeframes, and/or the like. Based on the technology contexts, the system, via the interdependency analyzer application 220, may then determine one or more interdependent technology activity events associated with the first technology activity, based on analyzing the extracted prior technology event data extracted from the prior technology event database 204. The event interdependency analyzer application 220 is structured to analyze interdependency between events.

Here, the system, via the event interdependency analyzer application 220 may first parse the prior technology event data to determine a prior first technology activity event that matches the first technology activity. The system may parse prior user activity data of numerous prior activities. The system may then identify a prior first technology activity event associated with the first networked device in the user activity log, that is substantially similar to the current first technology activity event. For example, the system may identify any past activity events of the user receiving deposits in the past, or past calls to the entity system for user support from the user. Next, the system may identify one or more prior second technology activities from the prior technology event data, e.g., (i) which succeeded the prior first technology activity event, and/or (ii) which occurred which a predetermined time window around the time of the prior first technology activity event. For example, the system may identify past technology activity events that were performed by the user within a predetermined time interval (e.g., 2 hours, 1 day, etc.) succeeding the occurrence of any past activity events of the user receiving deposits in the past, or past calls to the entity system for user support from the user. Next, the system may determine which of the identified one or more prior second technology activities are mutually interdependent on/with the prior first technology activity event. Here, the system may ascertain that one or more of the identified prior second technology activities are mutually interdependent on/with the prior first technology activity event, based on determining that (i) the one or more prior second technology activities succeeded the prior first technology activity event, and that (ii) the one or more prior second technology activities comprise an event nexus with the prior first technology activity event. The system may then determine/designate the one or more of the identified prior second technology activities that are mutually interdependent on/with the prior first technology activity event, as the one or more interdependent technology activity events for the first technology activity event currently being performed.

Determining the "event nexus" between the prior first technology activity event and the one or more prior second technology activities may refer to determining/constructing/detecting a relationship, an overlap, a commonality, etc., e.g., between otherwise temporally disparate first and second activity events. In some instances, the system may determine a "event nexus" between the prior first technology activity event and the one or more prior second technology activities based on a relationship, an overlap, a commonality, etc., between technical characteristics or event data of these activity events, such as activity type information, temporal activity information, positional/geographic information, prior activity performance information, and/or future activity schedule information, and/or the like.

Continuing with the previous example, for a first technology activity event of the user receiving a deposit of a resource value (e.g., an amount, salary, etc.) at a first resource (e.g., account), the system may determine that a prior second technology activity of a user viewing data associated with a second resource after a time interval of 1 day after a prior first technology activity event of the user previously receiving a deposit of a resource value (e.g., an amount, salary, etc.) at a first resource (e.g., account), as not being interrelated with a prior first technology activity event. Here, the system may further determine that another prior second technology activity of the user performing a resource transfer associated with a utility bill within a time interval of 5 hours of the prior first technology activity event of the user previously receiving a deposit of a resource value (e.g., an amount, salary, etc.) at a first resource (e.g., account), as being interrelated with the prior first technology activity event and also the first technology activity event. Similarly, as another example, the system may further determine that prior second technology activities of (i) the user logging into a webpage/account associated with user support using a second device such as a user laptop computer, and/or (ii) the user initiating a text-based chat with a user support representative using a second device such as a user laptop computer within a time interval of 15 minutes of the prior first technology activity event of the user previously placing telephone call to an entity system for user support from a first user device such as smartphone (e.g., with the call being unsuccessful due to call being disconnected before resolution of an item), as being interrelated with the prior first technology activity event, as well as the first technology activity event of the user currently placing telephone call to an entity system for user support from a first user device such as smartphone (e.g., with the call being unsuccessful due to call being disconnected before resolution of an item).

As yet other non-limiting examples, for a current first technology activity event of the purchasing tickets to a sporting event, the system may identify a prior first technology activity event previously conducted by the user of purchase of tickets for a musical event at a prior date/time A. The system may further identify a prior second technology activity associated from the user activity log. Continuing with the previous example, the system may identify and parse through prior user activities that occurred after the prior first technology activity event for a predetermined time interval succeeding the prior first technology activity event. Here, the system may identify that the musical event occurred at a prior date/time B succeeding date/time A, and determine the predetermined time interval to be the time period between the data/time A and date/time B, and analyze activities conducted by the user therein. In some embodiments, the system typically (i) determines that the prior second technology activity comprises the event nexus with the prior first technology activity and (ii) selects the prior second technology activity as the interdependent technology activity event associated with the current first technology activity event. Continuing with the previous example, the system may identify a prior second activity that the user previously purchased parking tickets a date/time between times A and B, for parking a geographic location at the event using a particular device. In response to determining that the prior first activity event and the currently being analyzed first technology activity event are both resource type events, the system may determine an interdependent technology activity event of purchasing parking tickets as well. The system may further customize the interdependent technology activity event of purchasing parking tickets to the location and time of the currently being analyzed first technology activity event. Here, the cached data for the interdependent technology activity event is constructed to facilitate obtaining the parking tickets for a time and a location corresponding to the event of the first technology activity event.

As discussed previously, the one or more interdependent technology activity events may comprise a plurality of interdependent technology activity events associated with the first technology activity. Here, the system may determine a context severity parameter associated with each of the plurality of interdependent technology activity events. In some embodiments, the context severity may refer to a probability score of the interdependent technology activity event occurring, prior repetitions/reoccurrences of user activities, and/or the like. Subsequently, the system may identify the second technology activity event of the plurality of interdependent technology activity events based on the determining that the context severity parameter of the second technology activity event is above a predetermined threshold.

Moreover, the system via the event interdependency analyzer application 220 may determine a time latency associated with each of the one or more determined interdependent technology activity events based on analyzing the extracted prior technology, as indicated by block 310. Here, determining the time latency comprises determining a time to fetch parameter associated with the one or more determined interdependent technology activity events.

The system, via the event interdependency analyzer application 220 is further configured to determine (i) what data is required to be cached for the one or more interdependent technology activity events, (ii) the time to fetch parameter for retrieval (e.g., when this data needs to be fetched for most current data to be available for the interdependent activity event), and (iii) where this data needs to be fetched from. First, the system may determine what data is likely necessary for performing the interdependent technology activity event, and what data may be cached therefor to expedite the activity event and reduce processing and memory loads and delays. For example, the system may determine resource data (e.g., account data), billing information, etc., as the cached data for an interdependent technology activity event of an outgoing resource transfer associated with a utility bill. For example, the system may determine login information, user information, entity item information, etc., as the cached data for interdependent technology activity events of the user logging into a webpage/account associated with user support using a second device such as a user laptop computer, and/or (ii) the user initiating a text-based chat with a user support representative using a second device such as a user laptop computer. For example, the system may determine login information, billing information, parking location information, availability information during the required time interval, etc., as the cached data for an interdependent technology activity event of the user purchasing parking tickets for the sporting event.

Second, the system may determine a "time latency" or "time latency parameter" associated with each of the one or more determined interdependent technology activity events based on analyzing the extracted prior technology data. Here, the "time latency" or "time latency parameter" may refer to the time interval or the likely time interval between the first technology activity event and the subsequent interdependent technology activity event. In other words, the time latency" or "time latency parameter" may refer to how long after the occurrence of the first technology activity event, will the interdependent technology activity event be initiated. The system may determine this based on the corresponding time interval between the prior first technology activity event and the subsequent prior second technology activity, described previously. Here, the system may personalize the time latency for individual users. For example, for a first user may have a time latency of around 25 minutes for initiating an interdependent technology activity event of a text-based chat with a user support representative using a second device such as a user laptop computer after end of a first technology activity event of the user previously placing telephone call to an entity system for user support from a first user device such as smartphone (e.g., with the call being unsuccessful due to call being disconnected before resolution of an item). On the other hand, a second user may have reduced a time latency of around 10 minutes for initiating an interdependent technology activity event of a text-based chat with a user support representative using a second device such as a user laptop computer after end of a first technology activity event of the user previously placing telephone call to an entity system for user support from a first user device such as smartphone (e.g., with the call being unsuccessful due to call being disconnected before resolution of an item).

Next, the system may further determine a "time to fetch" parameter based on the determined time latency. The time to fetch parameter may refer to the optimal time for fetching the data for caching for the interdependent technology activity event, without the data becoming obsolete by the time the interdependent technology activity event is performed. In other words, the time to fetch parameter indicates how long before the interdependent technology activity event does the data for caching needs to be fetched, such that the most current data is available at the time of performing the interdependent technology activity event, without the data becoming obsolete by the time the interdependent technology activity event is performed. The time latency parameter and the time to fetch parameter are structured to preclude data from being cached too far in advance of the interdependent technology activity event, thereby ensuring that cache memory is not overloaded with large amounts of data for prolonged time periods, and ensuring that the most current data is available at the time of performing the activity event. Data that is cached too far in advance of the interdependent technology activity event may undesirably become obsolete or irrelevant and thereby be unusable or cause errors in performing the subsequent interdependent technology activity event. Typically, the time to fetch parameter is determined based on the time latency parameter. For example, for an interdependent technology activity having a time latency of around 6 hours after occurrence of the first technology activity event, the system may determine a time to fetch parameter of 5.8 hours after the first technology activity event or 0.2 hours preceding the interdependent technology activity.

Subsequently, the system may determine second event data required for executing the second technology activity event of the one or more determined interdependent technology activity events, as described above. Moreover, the system may determine the one or more event data hub devices 262 of a plurality of event data hub devices comprising the second event data required for executing the second technology activity event of the one or more determined interdependent technology activity events. Here, the system may determine which system of record (SOR) systems (SOR system-1, 262*a*, SOR system-2, 262*b*, SOR system-3, 262*c*, . . . , SOR system-N, 262*n*) of the system of records (SORs) event data hub 262 comprise the relevant data to be cached. Specifically, the system, via the event interdependency analyzer application 220 may determine which of the SOR event hub systems 262*a* to 262*n* comprise the relevant data for caching for execution of the one or more determined interdependent technology activity events.

Next at block 312, the system via the context processing and data caching application 260 (data caching application 26) may extract second event data for execution of a second technology activity event of the one or more determined interdependent technology activity events from one or more event data hub devices 262 at a predetermined first time interval preceding a second time associated with initiation of the second technology activity event. Here, the predetermined first time interval is associated with the determined time to fetch parameter associated with the time latency of the first technology activity event. The context processing and data caching application 260 may store the retrieved data to be cached, e.g., temporarily, at the cached data storage 270, prior to transmission to the respective channel adapters.

Subsequently, the system may cache the extracted second event data for the second technology activity event of the one or more determined interdependent technology activity events prior to the second time associated with initiation of the second technology activity at a second network device associated with a second communication channel, via a channel adapter 280 associated with the second communication channel, such that the cached second event data is structured for execution of the second technology activity event at the second time in future, as indicated by block 314. Here, in some embodiments, the second communication channel may be different from the first communication channel, while in other embodiments, the second communication channel may be the same as, or similar to the first communication channel.

The system may further determine suitable devices and/or channels for performing the second technology activity event of the one or more determined interdependent technology activity events. In some embodiments, the system may identify, for the second technology activity event of the one or more determined interdependent technology activity events, one or more network devices for executing the second technology event. The system may then determine the second network device of the one or more network devices for executing the second technology event based on (i) the one or more technology contexts associated with the first technology activity, and/or (ii) prior technology event data associated with the first network device and/or the user. Moreover, the system may identify the channel adapter configured to transform the extracted second event data into a format compatible with the second communication channel associated with the second network device. The system may then transmit the extracted second event data to the channel adapter associated with the second communication channel. Here, the system may transmit the extracted second event data to a cache server database associated with the channel adapter of the second communication channel of the second networked device.

Specifically, the system, via the cached data storage 270 may then transmit the cached data to one or more channel adapters 280 (channel adapter A 280*a* for communication channel A, channel adapter B 280*b* for communication channel B, channel adapter C 280*c* for communication channel C, . . . , and/or channel adapter N 280*n* for communication channel N) in accordance to the communication channel it needs to be transmitted to. Here, each channel adapter 280 (channel adapter A 280*a*, channel adapter B 280*b*, channel adapter C 280*c*, . . . , and/or channel adapter N 280*n*) is structured for transforming the extracted cached data from the cached data storage 270 into a format compatible with is respective communication channel. For example, the interdependent technology activity may be associated with a third device associated with a communication channel C having an adapter C 280*c*. In other words, the system may cache the extracted second event data for the a determined interdependent technology activity event (e.g., a second technology activity event) prior to the second time associated with initiation of the second technology activity at a second network device associated with a second communication channel, via a channel adapter associated with the second communication channel, such that the cached second event data is structured for execution of the second technology activity event at the second time in future. In this way the system customizes/transforms the cached data to be compatible with the channel/device of the interdependent technology activity. Moreover, the cross-channel data caching of the present invention allows for cache data to be utilized across-channels while being compatible with the required channel. Moreover, the cross-channel data caching of the present invention allows for caching of data for an interdependent activity at a second channel/device based on a first activity at a first channel/device. The cached data may then be utilized for performing the interdependent technology activity events at the respective user devices 104, auxiliary user devices 170 and/or resource processing devices 120.

In some embodiments, for caching the extracted second event data for the second technology activity event, the system may transmit the extracted second event data to a cache server database associated with the channel adapter 280 of the second communication channel of the second networked device. As discussed previously, the channel adapter 280 configured to transform the extracted second event data into a format compatible with the second communication channel associated with the second network device. Next, the system may store the extracted second event data in the cache server database 270 associated with the channel adapter of the second communication channel until elapse of the predetermined second time interval associated with the time to live parameter with the second technology activity.

Next, at block 316, the system may determine a time to live parameter associated with the second technology activity of the one or more determined interdependent technology activity events. Here, the system is further configured to determine a time to live parameter that relates to how long the cached data is stored before it is discarded. Moreover, the time to live parameter is customized and tailored to the specific user and the specific interdependent technology activity. For example, the time to live parameter may be determined to be 3 hours for a second technology activity event of the one or more determined interdependent technology activity events, and 40 minutes for a third technology activity event of the one or more determined interdependent technology activity events, based on analyzing the prior activity event data and data associated with the particular interdependent technology activity event (e.g., time duration for processing the activity event). The cached data may be erased from the cached data storage 270 upon elapse of the time to live parameters, e.g., irrespective of whether the data has been utilized for performing the interdependent technology activity events, thereby preventing undesirable burdens on cache memory devices due to perpetual or long-term storage of likely unnecessary cached data. The time to live parameter may be determined using a function that processes variables such as a context severity (e.g., intent severity), technology context of the interdependent technology activity events, user activity information/data, and/or the like. In some embodiments, the context severity may refer to a probability score of the interdependent technology activity event occurring, prior repetitions/reoccurrences of user activities, and/or the like. A non-limiting example of the function for the time to live parameter is provided below:

$$(\text{Time to live parameter}) = f(\text{technology context}_{interdependency}, \text{context severity}, \text{user activity data})$$

Moreover, the system may discard the cached second event data at the second network device upon determining elapse of a predetermined second time interval associated with the time to live parameter associated with the second technology activity, as indicated by block 318. In some embodiments, discarding the cached second event data at the second network device further comprises deleting the stored second event data in the cache server database upon elapse of the predetermined second time interval associated with the time to live parameter with the second technology activity.

FIG. 4 depicts a high level process flow 400 for executing an interdependent activity using dynamically adapted, time latency-based, cross channel data caching, in accordance with one embodiment of the present invention. In some embodiments, the processing device 138 of the caching technology system 106 may execute the computer-readable program code/instructions 142 to perform one or more steps of the process flow 400. The caching technology system 106 may perform some or all of the steps of the process flow 400, or cause other devices (entity system 180, entity database 190, and/or other devices communicating via network 101) to perform some or all of the steps of the process flow 400.

As indicated by block 402, the system may detect, via the second network device associated with the second communication channel, initiation of the second technology activity event by the user at the second time. Here, the system may identify that that the second technology activity event is interdependent on the first technology activity event of block 302 described previously. Here, at block 404 the system may extract the cached second event data via the channel adapter associated with the second communication channel described previously with respect to block 314. Here, the system may override an existing extraction protocol associated with a cache server database associated with the channel adapter of the second communication channel of the second networked device. Existing extraction protocols for caching may be round robin, first come first serve (FCFS), least recently used, and/or the like. As discussed previously, typically, the channel adapter configured to transform the extracted second event data into a format compatible with the second communication channel associated with the second network device The system may then transmit the cached second event data to the second networked device, as indicated by block 406. Moreover at block 408, the system may execute the second technology activity event at the second networked device using the cached second event data, and thereafter discard/erase the cached data.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for dynamically adapted, time latency-based, cross channel data caching for performing electronic activities, wherein the system is structured for selective proactive data caching based on interdependency of electronic activities and transformation of cached data for transmission through a plurality of communication channels, for reducing memory and processing burdens on data caching servers and reducing turnaround time for activity execution, the system comprising:
   at least one memory device with computer-readable program code stored thereon;
   at least one communication device;
   at least one processor operatively coupled to the at least one memory device and the at least one communication device, wherein executing the computer-readable program code is configured to cause the at least one processor to:
      detect initiation of a first technology activity event by a user at a first time via a first network device associated with a first communication channel;
      capture live event data associated with the first technology activity event via the first network device;
      extract, from a technology event database, prior technology event data associated with the first network device and/or the user based on analyzing the live event data;
      determine, via an event interdependency analyzer application, (i) one or more technology contexts associated with the first technology activity event and (ii) one or more interdependent technology activity events associated with the first technology activity event, based on analyzing the extracted prior technology event data;
      determine, via the event interdependency analyzer application, a time latency associated with each of the one or more determined interdependent technology activity events based on analyzing the extracted prior technology data, wherein determining the time latency comprises determining a time to fetch parameter associated with the one or more determined interdependent technology activity events;
      extract, via a data caching application, second event data for execution of a second technology activity event of the one or more determined interdependent technology activity events from one or more event data hub devices at a predetermined first time interval preceding a second time associated with initiation of the second technology activity event, wherein the predetermined first time interval is associated with the determined time to fetch parameter associated with the time latency of the first technology activity event;

cache the extracted second event data for the second technology activity event of the one or more determined interdependent technology activity events prior to the second time associated with initiation of the second technology activity event at a second network device associated with a second communication channel, via a channel adapter associated with the second communication channel, such that the cached second event data is structured for execution of the second technology activity event at the second time in future;

determine a time to live parameter associated with the second technology activity event of the one or more determined interdependent technology activity events; and discard the cached second event data at the second network device upon determining elapse of a predetermined second time interval associated with the time to live parameter associated with the second technology activity event.

2. The system of claim 1, wherein the determining the one or more interdependent technology activities associated with the first technology activity event further comprises:

parsing the prior technology event data to determine a prior first technology activity event that matches the first technology activity event;

identifying one or more prior second technology activities from the prior technology event data; and determining the one or more prior second technology activities as the one or more interdependent technology activities in response to identifying that (i) the one or more prior second technology activities succeeded the prior first technology activity event, and that (ii) the one or more prior second technology activities comprise an event nexus with the prior first technology activity event.

3. The system of claim 1, wherein the one or more interdependent technology activity events comprise a plurality of interdependent technology activity events associated with the first technology activity event, wherein executing the computer-readable program code is configured to cause the at least one processor to:

determine a context severity parameter associated with each of the plurality of interdependent technology activity events; and identify the second technology activity event of the plurality of interdependent technology activity events based on the determining that the context severity parameter of the second technology activity event is above a predetermined threshold.

4. The system of claim 1, wherein executing the computer-readable program code is configured to cause the at least one processor to:

determine second event data required for executing the second technology activity event of the one or more determined interdependent technology activity events; and determine the one or more event data hub devices of a plurality of event data hub devices comprising the second event data required for executing the second technology activity event of the one or more determined interdependent technology activity events.

5. The system of claim 1, wherein caching the extracted second event data for the second technology activity event, further comprises:

transmitting the extracted second event data to a cache server database associated with the channel adapter of the second communication channel of the second networked device, wherein the channel adapter configured to transform the extracted second event data into a format compatible with the second communication channel associated with the second network device; and storing the extracted second event data in the cache server database associated with the channel adapter of the second communication channel until elapse of the predetermined second time interval associated with the time to live parameter with the second technology activity event; and wherein discarding the cached second event data at the second network device further comprises deleting the stored second event data in the cache server database upon elapse of the predetermined second time interval associated with the time to live parameter with the second technology activity event.

6. The system of claim 1, wherein executing the computer-readable program code is configured to cause the at least one processor to:

detect, via the second network device associated with the second communication channel, initiation of the second technology activity event by the user at the second time;

extract the cached second event data via the channel adapter associated with the second communication channel, wherein the channel adapter configured to transform the extracted second event data into a format compatible with the second communication channel associated with the second network device;

transmit the cached second event data to the second networked device; and execute the second technology activity event at the second networked device using the cached second event data.

7. The system of claim 6, wherein extracting the cached second event data further comprises: overriding an existing extraction protocol associated with a cache server database associated with the channel adapter of the second communication channel of the second networked device.

8. The system of claim 1, wherein executing the computer-readable program code is configured to cause the at least one processor to:

identify, for the second technology activity event of the one or more determined interdependent technology activity events, one or more network devices for executing the second technology event;

determine the second network device of the one or more network devices for executing the second technology event based on (i) the one or more technology contexts associated with the first technology activity event, and/or (ii) prior technology event data associated with the first network device and/or the user;

identify the channel adapter configured to transform the extracted second event data into a format compatible with the second communication channel associated with the second network device; and transmit the extracted second event data to the channel adapter associated with the second communication channel.

9. The system of claim 8, wherein transmitting the extracted second event data to the channel adapter, further comprises transmitting the extracted second event data to a cache server database associated with the channel adapter of the second communication channel of the second networked device.

10. The system of claim 1, wherein the second communication channel is different from the first communication channel.

11. A computer program product for dynamically adapted, time latency-based, cross channel data caching for performing electronic activities, wherein the computer program product is structured for selective proactive data caching based on interdependency of electronic activities and transformation of cached data for transmission through a plurality of communication channels, for reducing memory and processing burdens on data caching servers and reducing turnaround time for activity execution, the computer program product comprising a non-transitory computer-readable storage medium having computer-executable instructions to:
    detect initiation of a first technology activity event by a user at a first time via a first network device associated with a first communication channel;
    capture live event data associated with the first technology activity event via the first network device;
    extract, from a technology event database, prior technology event data associated with the first network device and/or the user based on analyzing the live event data;
    determine, via an event interdependency analyzer application, (i) one or more technology contexts associated with the first technology activity event and (ii) one or more interdependent technology activity events associated with the first technology activity event, based on analyzing the extracted prior technology event data;
    determine, via the event interdependency analyzer application, a time latency associated with each of the one or more determined interdependent technology activity events based on analyzing the extracted prior technology data, wherein determining the time latency comprises determining a time to fetch parameter associated with the one or more determined interdependent technology activity events;
    extract, via a data caching application, second event data for execution of a second technology activity event of the one or more determined interdependent technology activity events from one or more event data hub devices at a predetermined first time interval preceding a second time associated with initiation of the second technology activity event, wherein the predetermined first time interval is associated with the determined time to fetch parameter associated with the time latency of the first technology activity event;
    cache the extracted second event data for the second technology activity event of the one or more determined interdependent technology activity events prior to the second time associated with initiation of the second technology activity event at a second network device associated with a second communication channel, via a channel adapter associated with the second communication channel, such that the cached second event data is structured for execution of the second technology activity event at the second time in future;
    determine a time to live parameter associated with the second technology activity event of the one or more determined interdependent technology activity events; and
    discard the cached second event data at the second network device upon determining elapse of a predetermined second time interval associated with the time to live parameter associated with the second technology activity event.

12. The computer program product of claim 11, wherein the non-transitory computer-readable storage medium further comprises computer-executable instructions to:
    determine second event data required for executing the second technology activity event of the one or more determined interdependent technology activity events; and
    determine the one or more event data hub devices of a plurality of event data hub devices comprising the second event data required for executing the second technology activity event of the one or more determined interdependent technology activity events.

13. The computer program product of claim 11, wherein caching the extracted second event data for the second technology activity event, further comprises:
    transmitting the extracted second event data to a cache server database associated with the channel adapter of the second communication channel of the second networked device, wherein the channel adapter configured to transform the extracted second event data into a format compatible with the second communication channel associated with the second network device; and
    storing the extracted second event data in the cache server database associated with the channel adapter of the second communication channel until elapse of the predetermined second time interval associated with the time to live parameter with the second technology activity event; and
    wherein discarding the cached second event data at the second network device further comprises deleting the stored second event data in the cache server database upon elapse of the predetermined second time interval associated with the time to live parameter with the second technology activity event.

14. The computer program product of claim 11, wherein the non-transitory computer-readable storage medium further comprises computer-executable instructions to:
    detect, via the second network device associated with the second communication channel, initiation of the second technology activity event by the user at the second time;
    extract the cached second event data via the channel adapter associated with the second communication channel, wherein the channel adapter configured to transform the extracted second event data into a format compatible with the second communication channel associated with the second network device;
    transmit the cached second event data to the second networked device; and
    execute the second technology activity event at the second networked device using the cached second event data.

15. The computer program product of claim 14, wherein extracting the cached second event data further comprises: overriding an existing extraction protocol associated with a cache server database associated with the channel adapter of the second communication channel of the second networked device.

16. The computer program product of claim 11, wherein the non-transitory computer-readable storage medium further comprises computer-executable instructions to:
    identify, for the second technology activity event of the one or more determined interdependent technology activity events, one or more network devices for executing the second technology activity event;
    determine the second network device of the one or more network devices for executing the second technology event based on (i) the one or more technology contexts associated with the first technology activity event, and/or (ii) prior technology event data associated with the first network device and/or the user;

identify the channel adapter configured to transform the extracted second event data into a format compatible with the second communication channel associated with the second network device; and transmit the extracted second event data to the channel adapter associated with the second communication channel.

17. A method for dynamically adapted, time latency-based, cross channel data caching for performing electronic activities, wherein the method is structured for selective proactive data caching based on interdependency of electronic activities and transformation of cached data for transmission through a plurality of communication channels, for reducing memory and processing burdens on data caching servers and reducing turnaround time for activity execution, the method comprising:

detecting initiation of a first technology activity event by a user at a first time via a first network device associated with a first communication channel;

capturing live event data associated with the first technology activity event via the first network device;

extracting, from a technology event database, prior technology event data associated with the first network device and/or the user based on analyzing the live event data;

determining, via an event interdependency analyzer application, (i) one or more technology contexts associated with the first technology activity event and (ii) one or more interdependent technology activity events associated with the first technology activity event, based on analyzing the extracted prior technology event data;

determining, via the event interdependency analyzer application, a time latency associated with each of the one or more determined interdependent technology activity events based on analyzing the extracted prior technology data, wherein determining the time latency comprises determining a time to fetch parameter associated with the one or more determined interdependent technology activity events;

extracting, via a data caching application, second event data for execution of a second technology activity event of the one or more determined interdependent technology activity events from one or more event data hub devices at a predetermined first time interval preceding a second time associated with initiation of the second technology activity event, wherein the predetermined first time interval is associated with the determined time to fetch parameter associated with the time latency of the first technology activity event;

caching the extracted second event data for the second technology activity event of the one or more determined interdependent technology activity events prior to the second time associated with initiation of the second technology activity event at a second network device associated with a second communication channel, via a channel adapter associated with the second communication channel, such that the cached second event data is structured for execution of the second technology activity event at the second time in future;

determining a time to live parameter associated with the second technology activity event of the one or more determined interdependent technology activity events; and discarding the cached second event data at the second network device upon determining elapse of a predetermined second time interval associated with the time to live parameter associated with the second technology activity event.

18. The method of claim 17, wherein caching the extracted second event data for the second technology activity event, further comprises:

transmitting the extracted second event data to a cache server database associated with the channel adapter of the second communication channel of the second networked device, wherein the channel adapter configured to transform the extracted second event data into a format compatible with the second communication channel associated with the second network device; and storing the extracted second event data in the cache server database associated with the channel adapter of the second communication channel until elapse of the predetermined second time interval associated with the time to live parameter with the second technology activity event; and wherein discarding the cached second event data at the second network device further comprises deleting the stored second event data in the cache server database upon elapse of the predetermined second time interval associated with the time to live parameter with the second technology activity event.

19. The method of claim 17, wherein the method further comprises:

detecting, via the second network device associated with the second communication channel, initiation of the second technology activity event by the user at the second time;

extracting the cached second event data via the channel adapter associated with the second communication channel, wherein the channel adapter configured to transform the extracted second event data into a format compatible with the second communication channel associated with the second network device;

transmitting the cached second event data to the second networked device; and executing the second technology activity event at the second networked device using the cached second event data.

20. The method of claim 17, wherein the method further comprises:

identifying, for the second technology activity event of the one or more determined interdependent technology activity events, one or more network devices for executing the second technology activity event;

determining the second network device of the one or more network devices for executing the second technology event based on (i) the one or more technology contexts associated with the first technology activity event, and/or (ii) prior technology event data associated with the first network device and/or the user;

identifying the channel adapter configured to transform the extracted second event data into a format compatible with the second communication channel associated with the second network device; and transmitting the extracted second event data to the channel adapter associated with the second communication channel.

* * * * *